United States Patent
Zhang et al.

(10) Patent No.: US 11,587,280 B2
(45) Date of Patent: Feb. 21, 2023

(54) AUGMENTED REALITY-BASED DISPLAY METHOD AND DEVICE, AND STORAGE MEDIUM

(71) Applicant: Beijing Zitiao Network Technology Co., Ltd., Beijing (CN)

(72) Inventors: Wenhao Zhang, Beijing (CN); Zhili Chen, Los Angeles, CA (US); Ang Liu, Beijing (CN); Boyuan Hu, Beijing (CN); Weishan Yu, Culver City, CA (US)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/695,404

(22) Filed: Mar. 15, 2022

(65) Prior Publication Data
US 2022/0207811 A1   Jun. 30, 2022

Related U.S. Application Data

(63) Continuation of application No. PCT/SG2021/050508, filed on Aug. 26, 2021.

(30) Foreign Application Priority Data

Sep. 9, 2020   (CN) .......................... 202010937923.5

(51) Int. Cl.
*G06T 13/80* (2011.01)
*G06T 7/10* (2017.01)
(Continued)

(52) U.S. Cl.
CPC .............. *G06T 13/80* (2013.01); *G06T 7/10* (2017.01); *G06T 19/006* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2013/0222427 A1 | 8/2013 | Heo et al. | |
| 2018/0018083 A1* | 1/2018 | Cengil | B60K 35/00 |

(Continued)

FOREIGN PATENT DOCUMENTS

| | | |
|---|---|---|
| CN | 107067474 A | 8/2017 |
| CN | 109214876 A | 1/2019 |

(Continued)

OTHER PUBLICATIONS

Weng, Chung-Yi, Brian Curless, and Ira Kemelmacher-Shlizerman. "Photo wake-up: 3d character animation from a single photo." Proceedings of the IEEE/CVF Conference on Computer Vision and Pattern Recognition. 2019.*

(Continued)

*Primary Examiner* — Ryan M Gray
(74) *Attorney, Agent, or Firm* — BakerHostetler

(57) ABSTRACT

An augmented reality-based display method and device, and a storage medium are provided. The method obtains a target object image by performing object segmentation on a target object in a real-time scene image captured by an image acquisition unit; generates a virtual image corresponding to the target object based on the target object image; and displays the virtual image in the real-time scene image based on an augmented reality display technology. By obtaining the target object image, generating the virtual image corresponding to the target object based on the target object image, and displaying the virtual image in the real-time scene image based on an augmented reality (AR) technology, various virtual images can be generated according to user demands to meet the diverse needs of the user and (Continued)

improve the use experience of the user using the AR technology.

20 Claims, 6 Drawing Sheets

(51) Int. Cl.
*G06T 19/00* (2011.01)
*G06T 19/20* (2011.01)

(56) References Cited

U.S. PATENT DOCUMENTS

| | | | |
|---|---|---|---|
| 2019/0371071 | A1 | 12/2019 | Lyons |
| 2020/0088463 | A1* | 3/2020 | Jeong ............... G06F 3/011 |
| 2020/0234498 | A1 | 7/2020 | Price et al. |
| 2020/0372723 | A1* | 11/2020 | Komissarov ......... G06V 10/751 |
| 2021/0090321 | A1* | 3/2021 | Constable ............ G06T 19/006 |

FOREIGN PATENT DOCUMENTS

| | | |
|---|---|---|
| CN | 109427096 A | 3/2019 |
| CN | 109903392 A | 6/2019 |
| CN | 110412765 A | 11/2019 |
| CN | 110716645 A | 1/2020 |
| CN | 110827378 A | 2/2020 |
| CN | 111415422 A | 7/2020 |
| CN | 111638797 A | 9/2020 |
| CN | 111640193 A | 9/2020 |
| CN | 111640200 A | 9/2020 |
| CN | 113436301 A | 9/2021 |
| KR | 2020-0092207 A | 8/2020 |
| WO | WO 2016/111174 A1 | 7/2016 |

OTHER PUBLICATIONS

Wang, Jue, et al. "The cartoon animation filter." ACM Transactions on Graphics (TOG) 25.3 (2006): 1169-1173.*
Kholgade, Natasha, et al. "3D object manipulation in a single photograph using stock 3D models." ACM Transactions on Graphics (TOG) 33.4 (2014): 1-12.*
Li, Zhong, et al. "3D human avatar digitization from a single image." The 17th International Conference on Virtual-Reality Continuum and its Applications in Industry. 2019.*
International Patent Application No. PCT/SG2021/050508; Int'l Search Report and Written Opinion; dated Dec. 21, 2021; 10 pages.

* cited by examiner

AUGMENTED REALITY-BASED DISPLAY METHOD AND DEVICE, AND STORAGE MEDIUM

The present application is a continuation of International Patent Application No. PCT/SG2021/050508, filed on Aug. 26, 2021, which claims priority of Chinese Patent Application No. 202010937923.5, filed on Sep. 9, 2020, and the entire content disclosed by the Chinese patent application is incorporated herein by reference as part of the present application.

TECHNICAL FIELD

Embodiments of the present disclosure relate to an augmented reality-based display method and device, and a storage medium.

BACKGROUND

Augmented reality (AR) technology is a technology that integrates virtual information with the real world, widely uses various technical means, such as multimedia, three-dimensional modeling, real-time tracking and registration, intelligent interaction, and sensing, to simulate computer-generated virtual information, such as text, image, three-dimensional model, music, and video, and to apply the computer-generated virtual information to the real world. Two types of information complement each other, whereby "augmentation" of the real world is implemented. With the development of the AR technology, it has been extensively used in different industries.

An application of the AR technology in the prior art is to superimpose a virtual model (e.g., a cartoon character model, an animal model, etc.) onto the real world. However, the virtual model in the prior art is usually fixed, and is a virtual model image predesigned by developers, which results in a relatively single virtual model image, which cannot meet the diversified needs of users, thereby affecting the willingness of the users to use the AR technology and the use experience.

SUMMARY

Embodiments of the present disclosure provide an augmented reality-based display method and device, and a storage medium to solve the problem that the virtual model image is relatively single and cannot meet the diversified needs of users.

In a first aspect, an embodiment of the present disclosure provides an augmented reality-based display method, comprising: performing object segmentation on a target object in a real-time scene image captured by an image acquisition unit to obtain a target object image; generating a virtual image corresponding to the target object based on the target object image; and displaying the virtual image in the real-time scene image based on an augmented reality display technology.

In a second aspect, an embodiment of the present disclosure provides an augmented reality-based display device, comprising: a target object determination unit, configured to perform object segmentation on a target object in a real-time scene image captured by an image acquisition unit to obtain a target object image; a generation unit, configured to generate a virtual image corresponding to the target object based on the target object image; and a display unit, configured to display the virtual image in the real-time scene image based on an augmented reality display technology.

In a third aspect, an embodiment of the present disclosure provides an electronic device, including: at least one processor and a memory; the memory stores computer executable instructions; the at least one processor executes the computer executable instructions stored in the memory to cause the at least one processor to perform the method described in the first aspect and various possible designs of the first aspect above.

In a fourth aspect, an embodiment of the present disclosure provides a computer readable storage medium, the computer readable storage medium stores computer executable instructions, when the computer executable instructions are executed by a processor, the method described in the first aspect and various possible designs of the first aspect above is implemented.

Embodiments of the present disclosure provide an augmented reality-based display method and device, and a storage medium. The method may obtain a target object image by performing object segmentation on a target object in a real-time scene image captured by an image acquisition unit, generate a virtual image corresponding to the target object based on the target object image, and display the virtual image in the real-time scene image based on an augmented reality display technology. By obtaining the target object image and generating the virtual image corresponding to the target object based on the target object image, the problems that the virtual image needs to be pre-designed and the image is single and fixed can be avoided. In the embodiments of the present disclosure, various virtual images can be generated according to user demands, and the diverse needs of the user can be met. The virtual image can be enhanced and displayed in the real-time scene image by using the augmented reality technology, so that the willingness of the user to use the AR technology and the use experience can be improved.

BRIEF DESCRIPTION OF THE DRAWINGS

In order to more clearly illustrate the technical solutions in the embodiments of the present disclosure or the technical solutions in the known technology, the following briefly introduces the accompanying drawings that need to be used in the descriptions of the embodiments or the known technology, it is apparent that the accompanying drawings in the following description are some embodiments of the present disclosure, for those skilled in the art, other drawings can also be obtained according to these drawings on the premise of no creative work.

DETAILED DESCRIPTION

In order to make objects, technical solutions, and advantages of the embodiments of the present disclosure more apparent, the technical solutions of the embodiments of the present disclosure will be clearly and completely described below with reference to the accompanying drawings in the embodiments of the present disclosure. Apparently, the described embodiments are just a part but not all of the embodiments of the present disclosure. Based on the embodiments in the present disclosure, those skilled in the art can obtain other embodiment(s), without any inventive work, which should be within the protection scope of the present disclosure.

The embodiments of the present disclosure can be applied to any electronic device having an AR function, such as a smart phone, a tablet computer, and a wearable device, etc., the application scenarios of the embodiments of the present disclosure may include that, for example, an electronic device captures a real-time scene image through an image acquisition unit thereof, generates a corresponding virtual image according to a target object in the real-time scene, and finally displays the generated virtual image in the real-time scene image through an augmented reality-based display method according to various embodiments of the present disclosure. For example, the target object in the real-time scene image is a mango, and a virtual image corresponding to the target object mango is generated by using the method of generating a virtual image in the embodiments of the present disclosure. The virtual image corresponding to the mango can be displayed in the real-time scene image and further dynamically displayed in the form of animation after the virtual image is processed by the augmented reality-based display method according to various embodiments of the present disclosure. Furthermore, the virtual image corresponding to the mango may have limbs and/or expressions, and the limbs and/or expressions may have certain movements, such that the virtual image corresponding to the mango moves in the real-time scene.

Figure 1:
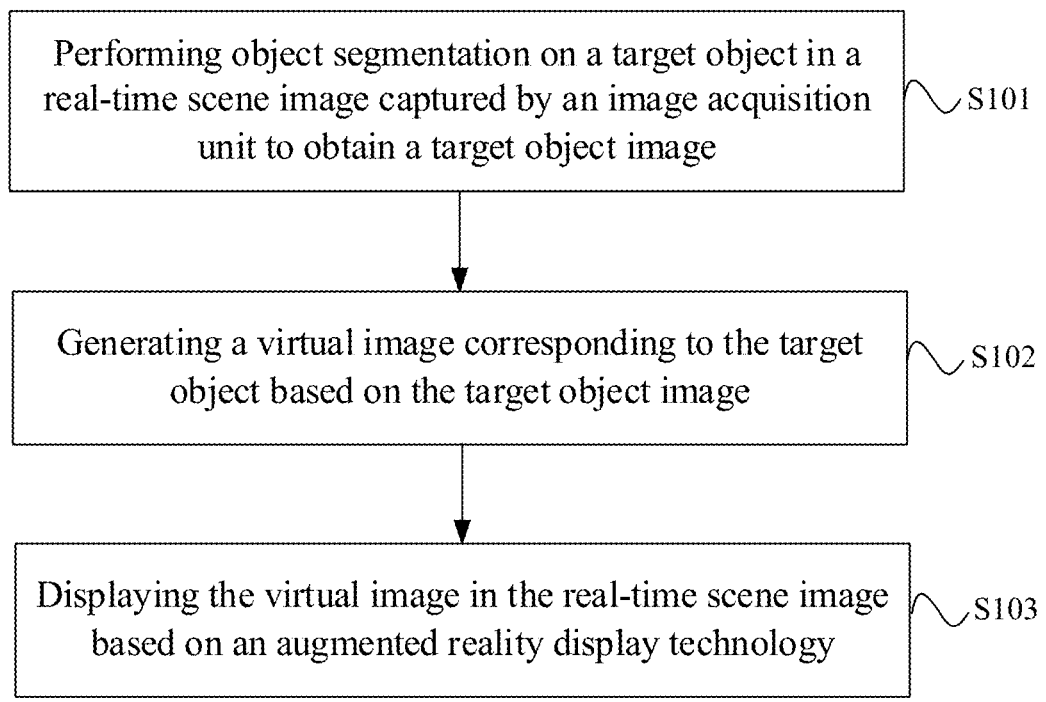
FIG. 1 is a schematic flowchart of an augmented reality-based display method according to an embodiment of the present disclosure.

Referring to FIG. 1, FIG. 1 is a schematic flowchart of an augmented reality-based display method according to an embodiment of the present disclosure. The method of the embodiment may be applied to an electronic device or a server having the AR function. The augmented reality-based display method may include steps described below.

S101, performing object segmentation on a target object in a real-time scene image captured by an image acquisition unit to obtain a target object image.

Figure 2A:
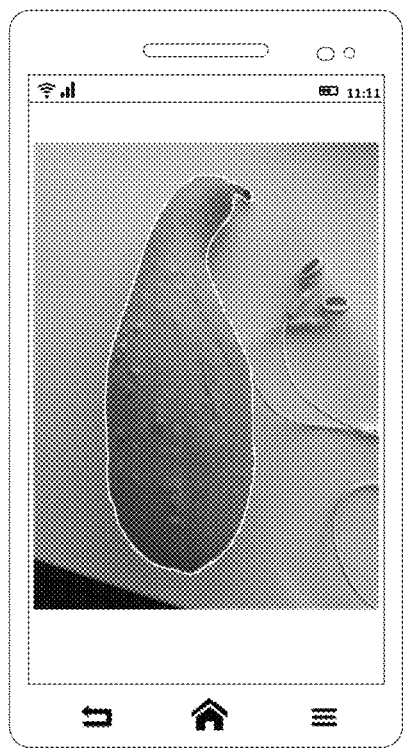
FIG. 2a is a diagram illustrating an example of displaying a contour of a target object image according to an embodiment of the present disclosure.

In the embodiment, an image acquisition unit, such as a camera, of the electronic device may capture a real-time scene image and display the real-time scene image in a display unit of the electronic device. The electronic device may obtain a target object image by segmenting a target object from the real-time scene image. Specifically, the electronic device may run an object segmentation algorithm that is pre-loaded to perform object segmentation on the real-time scene image to obtain the target object image. The object segmentation algorithm used in the embodiment of the present disclosure may include a salient object segmentation algorithm, during segmentation, a salient object in the real-time scene image can be used as the target object and be segmented to obtain the target object image. The salient object may be an object having a significant difference from a background color in the real-time scene image, and may also be an object in a central region of the real-time scene image, or an object occupying the largest area in the real-time scene image, etc. For example, as shown in FIG. 2a, a mango in a real-time scene image is located in the central region of the real-time scene image and occupies the largest area, and thus can be taken as the target object. Besides, a pair of earphones is not located in the central region of the real-time scene image and occupies a much smaller area than the mango, and thus is not taken as the target object.

In one embodiment, when a user wants to obtain a virtual image corresponding to a certain target object image in the real-time scene image, the user may give a first instruction such that the electronic device obtains the target object image in the real-time scene image in accordance with the first instruction. In one embodiment, the electronic device may, according to the first instruction, replicate the same target object image as the obtained target object image based on the target object image in the real-time scene image captured by the image acquisition unit, and generate a virtual image based on the replicated target object image.

Figure 2B:
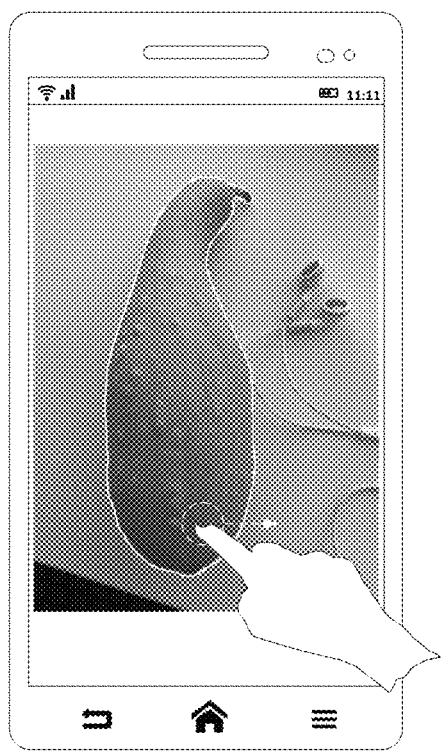
FIG. 2b is a diagram illustrating an example of a user issuing a first instruction and determining a target object image according to an embodiment of the present disclosure.

In one embodiment, when the electronic device segments the target object to obtain the target object image, the target object image can also be tagged, for example, the electronic device may highlight the target object image. For example, as shown in FIG. 2a, the electronic device can highlight the contour of the target object image through strokes, alternatively, can also highlight the target object image, alternatively, display image region other than the target object image at a lower brightness, etc., thereby allowing a user to confirm whether the target object currently segmented by the electronic device is consistent with the target object required by the user. When the user confirms that the target object is consistent with the target object required by the user, the user may issue the first instruction, where the first instruction includes but is not limited to a click operation instruction, a drag operation instruction, and the like for the tagged target object image, as shown in FIG. 2b, the user may give the above-mentioned drag operation instruction by dragging within the contour region of the target object image. When the user confirms that the target object is inconsistent with the target object required by the user, the user may move the electronic device, so that the image acquisition unit of the electronic device changes the angle to re-capture a real-time scene image, and then run the object segmentation algorithm again to segment a salient object in the real-time scene image as the target object and tag the obtained target object image. Thus, the user can reconfirm whether the current target object determined by the electronic device is consistent with the target object required by the user and whether the segmentation effect meets the user's expectation.

S102, generating a virtual image corresponding to the target object based on the target object image.

Figure 3:
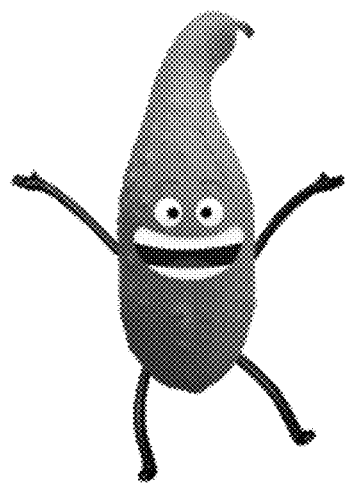
FIG. 3 is a diagram illustrating an example of a virtual image corresponding to a target object image according to an embodiment of the present disclosure.

In the embodiment, after obtaining the target object image (e.g., the target object image obtained after replicating from the original target object image), the electronic device may generate the virtual image corresponding to the target object based on the target object image, where the virtual image may have a limb-body movement and/or an expression movement. For example, when the object target image is the image of a mango, the corresponding virtual image may have limbs and facial expressions on the image of the mango, as shown in FIG. 3. Further, the limbs and expressions may have certain movements to drive the virtual image of the mango to move on the screen of the electronic device.

Alternatively, when generating the virtual image corresponding to the target object based on the target object image, the target object image may be synthesized with an animation material to generate the virtual image corresponding to the target object, the animation material includes a limb-body animation material and/or an expression animation material of the virtual image. In other words, in the embodiment, the limb-body movement and/or the expression movement of the virtual image corresponding to the target object may be preset to generate corresponding limb-body animation material and/or an expression animation material for use in subsequent synthesis process. That is to say, the limb-body animation material and/or expression animation material may be added to the target object image to obtain the virtual image corresponding to the target object, and the limbs and/or expressions of the virtual image may perform certain movements according to the playback of the limb-body animation material and/or expression animation material.

S103, displaying the virtual image in the real-time scene image based on an augmented reality display technology.

Figure 4:
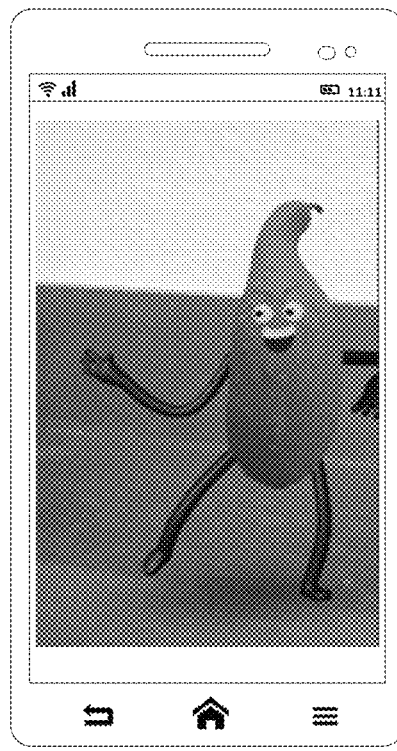
FIG. 4 is a diagram illustrating an example of displaying a virtual image in a real-time scene image according to an embodiment of the present disclosure.

In the embodiment, after obtaining the virtual image of the target object, the electronic device may display the virtual image of the target object in the real-time scene image by the augmented reality display technology. That is to say, the virtual image may be superimposed onto the realistic real-time scene image by the augmented reality display technology to achieve the effect of augmented display, as shown in FIG. 4. In one embodiment, the electronic device may dynamically display the virtual image of the target object in the real-time scene image.

In one embodiment, the electronic device may perform the augmented display of the virtual image in the real-time scene image in response to the first instruction from the user, the first instruction may include but are not limited to a click operation instruction, a drag operation instruction, a voice operation instruction, an operation instruction obtained by expression recognition, and the like, issued by the user, for the target object image. In addition, the electronic device may, after determining a display position for the virtual image, automatically perform the augmented display of the virtual image of the target object at the display position in the real-time scene image.

In an alternative embodiment, the user may drag the obtained replicated target object image from the initial position of the original target object image to a position in the real-time scene image. Further, the virtual image of the target object is displayed at this position based on the augmented reality display technology. Alternatively, the virtual image of the target object generated based on the replicated target object image may be displayed first, and then the virtual image may be displayed at a position in the real-time scene image based on the user's drag operation.

Optionally, the user may also rotate, zoom in or out, or move, etc. the displayed virtual image. For example, the user may give a control instruction for the virtual image on the display interface of the electronic device. The control instruction may include, but are not limited to, a rotation control instruction, a zoom-out control instruction, a move control instruction, a zoom-in control instruction, and the like, and the electronic device may perform corresponding control on the virtual image in response to the user's control instruction for the virtual image. It needs to be noted that the rotation in the embodiment may include a change in the angle of the virtual image under any case, and the move may include a change in the position of the virtual image under any case. The zoom-in or zoom-out (scaling) may include a change in the size of the virtual image under any case. As a matter of course, in the embodiment, the use may also perform more other interaction processes with the virtual image, which, for the sake of brevity, will not be described one by one redundantly herein.

The augmented reality-based display method provided in the embodiment may obtain the target object image by segmenting the target object from the real-time scene image captured by the image acquisition unit, generate the virtual image corresponding to the target object based on the target object image, and display the virtual image in the real-time scene image based on the augmented reality display technology. By obtaining the target object image and generating the virtual image corresponding to the target object based on the target object image, the problems that the virtual image needs to be pre-designed and the image is single and fixed can be avoided. In the embodiment, various virtual images can be generated according to user demands, and the diversified needs of users can be met. The virtual image can be displayed in the real-time scene image by using the augmented reality technology, so that the willingness of the users to use the AR technology and the use experience can be enhanced.

On the basis of any embodiment described above, when generating the virtual image corresponding to the target object based on the target object image, the target object image may be synthesized with an animation material to generate the virtual image corresponding to the target object, the animation material includes a limb-body animation material and/or an expression animation material of the virtual image.

Figure 5:
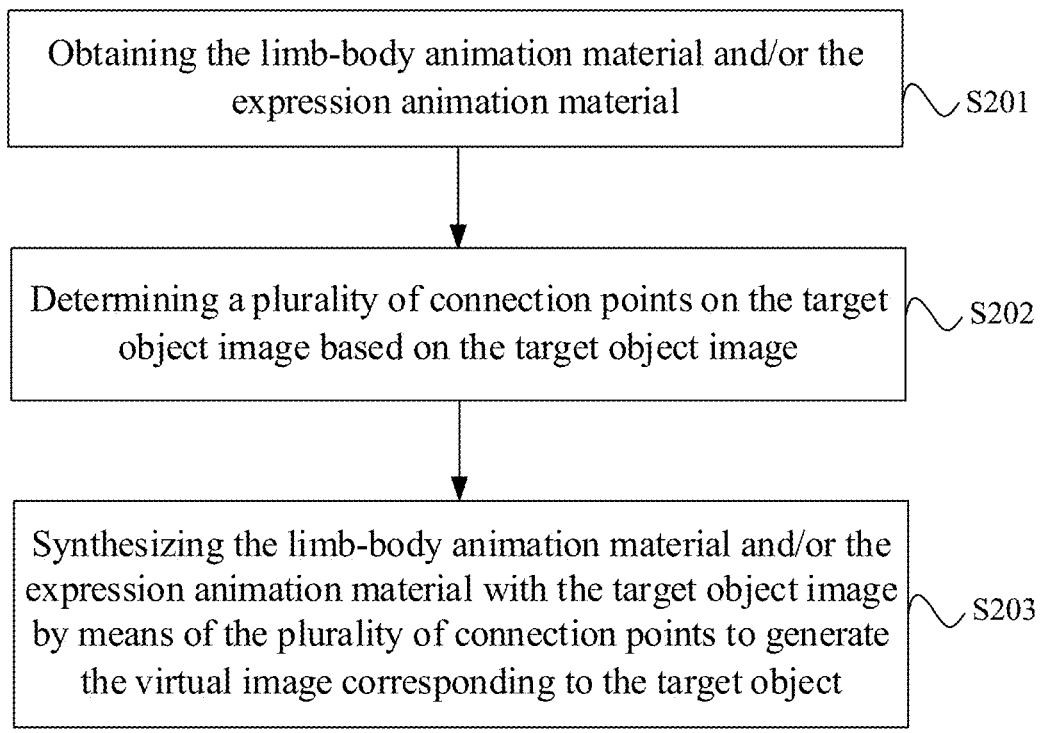
FIG. 5 is a schematic flowchart of an augmented reality-based display method according to an embodiment of the present disclosure.

Optionally, as shown in FIG. 5, the step of synthesizing the target object image with the animation material may specifically include:

S201, obtaining the limb-body animation material and/or the expression animation material;

S202, determining a plurality of connection points on the target object image based on the target object image; and S203, synthesizing the limb-body animation material and/or the expression animation material with the target object image by means of the plurality of connection points to generate the virtual image corresponding to the target object.

Figure 6:
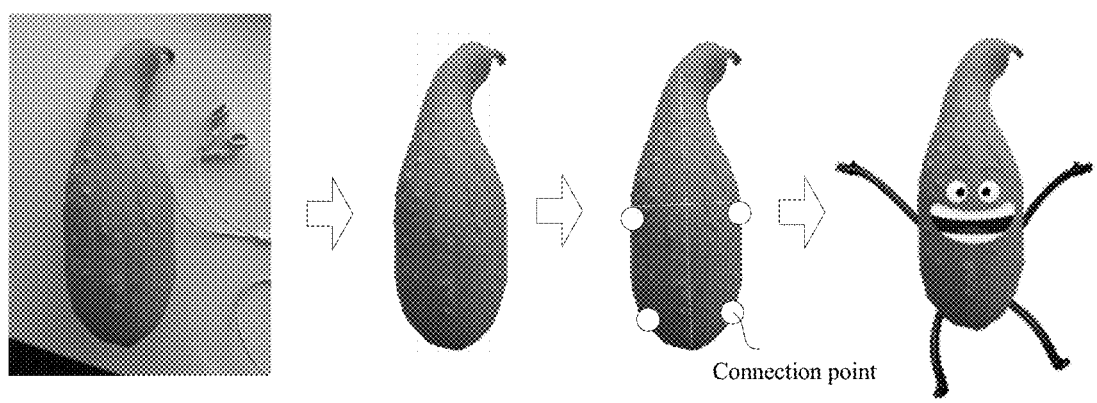
FIG. 6 is a diagram illustrating an example of a process of generating a virtual image corresponding to a target object according to an embodiment of the present disclosure.

In the embodiment, the electronic device may firstly obtain the limb-body animation material and/or the expression animation material of the virtual image, the limb-body animation material and/or the expression animation material may be pre-configured and stored in the electronic device. When synthesis is required, the electronic device may extract the limb-body animation material and/or the expression animation material and then determine a plurality of connection points on the target object image based on the properties (e.g., shape, size, texture) of the target object image, the connection points are positions where the limb-body animation material and/or the expression animation material is combined with the target object image. For example, the electronic device may set the target object image as the trunk of the body of the virtual image and the plurality of connection points determined on the target image as limb connection points. Thus, the connection points may include the connection positions of the limbs with the trunk of the body, furthermore, the electronic device may then synthesize the limb-body animation material with the target object image by means of the connection points such that the target object image has the limbs. In addition, the electronic device may also determine, according to the target object image, the placement position, such as the center of the trunk of the body, that is, the center position of the target object image, of an expression on the trunk of the body of the virtual image on the target object image, and synthesize the expression animation material with the target object image, so that the virtual image corresponding to the target object image also has the expression. In addition, the limbs and/or the expression may also have certain animation effects, and therefore, the virtual image corresponding to the target object having the animation effects is further generated, as shown in FIG. 6 in detail.

On the basis of the above embodiment, the step of obtaining a plurality of connection points on the target object image may specifically include: adjusting the animation material based on the target object image; and determining positions of the plurality of connection points on the target object image.

In the embodiment, because the target object images may vary in size, the animation material needs to be correspondingly adjusted based on the size of the target object image, so that the adjusted animation material can match the target object image in scale. Further, the electronic devices may also determine the positions of the plurality of connection points on the target object image based on factors such as a shape of the target object image, so that the animation material can be joined to the target object image at the connection points at appropriate positions to provide a good aesthetics appearance. That is to say, the adjusted limb-body animation material may be located at an appropriate position of the target object image, and the adjusted expression animation material may also be located at an appropriate position of the target object image.

According to the method in the embodiment of the present disclosure, performing, by the electronic device, object segmentation on the target object in the real-time scene image captured by the image acquisition unit to obtain the target object image includes: running an object segmentation algorithm to perform object segmentation on the target object in the real-time scene image, thereby obtaining a mask and a bounding box of the target object image and obtaining a texture of an internal region of the mask.

In the embodiment, when segmenting the target object by using the object segmentation algorithm, the mask Mask and the bounding box Box of the target object and the texture of the internal region of the mask may be obtained.

Correspondingly, the electronic device may adjust the size of the animation material based on the size of the bounding box and adjust the positions of the plurality of connection points on the target object image based on an axis of symmetry and a length-width ratio of the bounding box.

In the embodiment, the electronic device may adjust the size of the animation material based on the size of the bounding box and then adjust positions of the plurality of connection points on the target object image based on the axis of symmetry and the length-width ratio of the bounding box. In other words, in a case where the size of the bounding box is large, the size of the animation material is adaptively increased; in a case where the size of the bounding box is small, the size of the animation material is adaptively reduced. The electronic device may also determine the positions of the plurality of connection points on the target object image, for example, determine the positions of the connection points of the upper limbs and the positions of the connection points of the lower limbs, based on the axis of symmetry and the length-width ratio of the bounding box, and determine the placement position of a facial expression in the target image based on the target image, etc. The connection points of the limbs may be symmetrically arranged on two sides of the axis of symmetry of the target object image, and the specific positions of the connection points need to be determined based on the length-width ratio. For example, for a lanky (i.e., the bounding box has a larger length-width ratio) target object image, the connection points of the upper limbs need to be moved up and the connection points of the lower limbs need to be moved down. For a dumpy (i.e., the bounding box has a smaller length-width ratio) target object image, the connection points of the upper limbs need to be moved down and the connection points of the lower limbs need to be moved up, through the above adjustment, the final obtained virtual image may have more harmonious and reasonable body proportions.

On the basis of the above embodiment, synthesizing the limb-body animation material and/or the expression animation material with the target object image by means of the plurality of connection points to generate the virtual image corresponding to the target object includes: synthesizing the limb-body animation material and/or the expression animation material with texture of the internal region of the mask by means of the plurality of connection points to generate the virtual image corresponding to target object.

In the embodiment, the electronic device may synthesize the limb-body animation material and/or the expression animation material with the texture of the internal region of the mask by means of the connection points to obtain the virtual image corresponding to the target object, i.e., display the limb-body animation material and/or the expression animation material on the basis of the texture of the internal region of the mask. In one embodiment, after determining the connection points on the target object image and the adjusted size of the animation material, the electronic device may synthesize the limb-body animation material and/or the expression animation material with the texture of the internal region of the mask by means of the connection points to obtain the virtual image corresponding to the target object.

Further, the electronic device may also play the animation material, including playing the limb-body animation material and/or the expression animation material, thus performing movement and/or expression control on the virtual image, i.e., enabling the limbs and/or the expression of the virtual image to show corresponding movements.

Specifically, the electronic device may play the animation materials according to preset animation frames of the animation materials to perform movement and/or expression control on the virtual image, and/or generate and play animation frames of the animation materials based on the limb-body movement and/or expression of the user to perform movement and/or expression control on the virtual image corresponding to the target object. In other words, the above-mentioned animation material may include the preset animation frames, and it may be preset in the preset animation frames what specific animations are shown for the limbs and/or expressions. In one embodiment, the electronic device may also capture images of the user in real time and generate the animation frames of the limb-body animation material and/or expression animation material according to the limb-body movement and/or expression movement of the user, thus achieving that the user can control the movements of the virtual image corresponding to the target object through movements of the user. For example, when the user makes a certain limb-body movement, the virtual image correspondingly shows the same limb-body movement, and/or when the user makes a certain expression, the virtual image correspondingly shows the same expression. The operation experience and joy of the user can be enhanced by driving and controlling the movements of the virtual image corresponding to the target object using the user's movements.

On the basis of any embodiment described above, the step of displaying the virtual image in the real-time scene image based on the augmented reality display technology includes the following operations: creating a virtual plane in the real-time scene image; generating a three-dimensional (3D) space at the virtual plane; and displaying the virtual image of target object in the 3D space that is generated based on the augmented reality display technology.

In the embodiment, when performing the augmented display of the virtual image of the target object, in order to ensure that the movements of the virtual image in the real-time scene image is more realistic and three-dimensional, a virtual 3D space may be created in the real-time scene image. Specifically, the electronic device first creates the virtual plane in the real-time scene image, and then generates the 3D space onto the virtual plane on the basis of the virtual plane, furthermore, enhances and displays the virtual image in the 3D space based on the augmented reality display technology.

On the basis of the above embodiment, creating the virtual plane in the real-time scene image may specifically include: in a case of detecting that a target plane region exists in the real-time scene image, creating the virtual plane based on the target plane region, where the target plane region is a plane region having a distance to the image acquisition unit within a first preset distance range and/or a plane region located in a central region of the real-time scene image; or, creating the virtual plane at a particular position in the real-time scene image.

In the embodiment, the electronic device may detect a plane region included in the real-time scene image based on the real-time scene image through, for example, a simultaneous localization and mapping (SLAM) algorithm, and determine whether there is a plane region having a distance from the image acquisition unit within the first preset range and/or a plane region in the central region of the real-time scene image. If such a plane region exists, the plane region detected may be used as the target plane region. Further, the virtual plane is created on the basis of the target plane region, the virtual plane may be close to the target plane region, or be parallel to the target plane region and keep a certain fixed distance to the target plane region. If no target plane region is detected by the electronic device, the virtual plane may be created at a particular position in the real-time scene image. Alternatively, the electronic device does not detect the target plane region, the virtual plane is directly created at a particular position in the real-time scene image. The particular position in the real-time scene image may include regions such as the central region or the upper right corner of the real-time scene image, and a position where the particular position is specifically located in the real-time scene image may be set as needed in practice.

On the basis of the above embodiment, when displaying the virtual image of the target object in the 3D space generated, because the 3D space may be relatively large, it needs to be determined that the virtual image is specially displayed at a target position of the 3D space. That is to say, the target position may be determined in the 3D space first, and then the virtual image of the target object may be displayed at the target position of the 3D space based on the augmented reality display technology.

On the basis of the above embodiment, determining the target position in the 3D space may include: receiving a position specifying instruction from a user, establishing a three-dimensional anchor point in the three-dimensional space based on a position point triggered by the position specifying instruction from the user, and using the three-dimensional anchor point as the target position.

In the embodiment, the user may issue the position specifying instruction, and the electronic device may determine the position point triggered by the position specifying instruction from the user after receiving the position specifying instruction from the user. A line extends from the position point to the 3D space to form an intersection point between the line and the 3D space, and the 3D anchor point is created in the 3D space based on the intersection point. The 3D anchor point is the target position for displaying the virtual image in the 3D space, and then the electronic device may perform the augmented display of the virtual image of the target object at the 3D anchor point in the 3D space.

Optionally, the position specifying instruction from the user may be an end instruction for the user's drag operation on the virtual image, and the position (i.e., where the user's drag is ended) triggered by the drag end instruction is the position point triggered by the position specifying instruction from the user. In addition, the position specifying instruction may not be limited to the end instruction for the user's drag operation on the virtual image, and may also be a click operation instruction from the user, and the position point (i.e., where the user clicks) triggered by the click operation instruction is the position point triggered by the position specifying instruction from the user.

Of course, the electronic device may also display a virtual model at any position in the real-time scene image, for example, display in an arbitrary plane region identified by the electronic device in the real-time scene image. Of course, the electronic device may determine the display position of the virtual model in other ways, which will not be limited herein.

Figure 7:
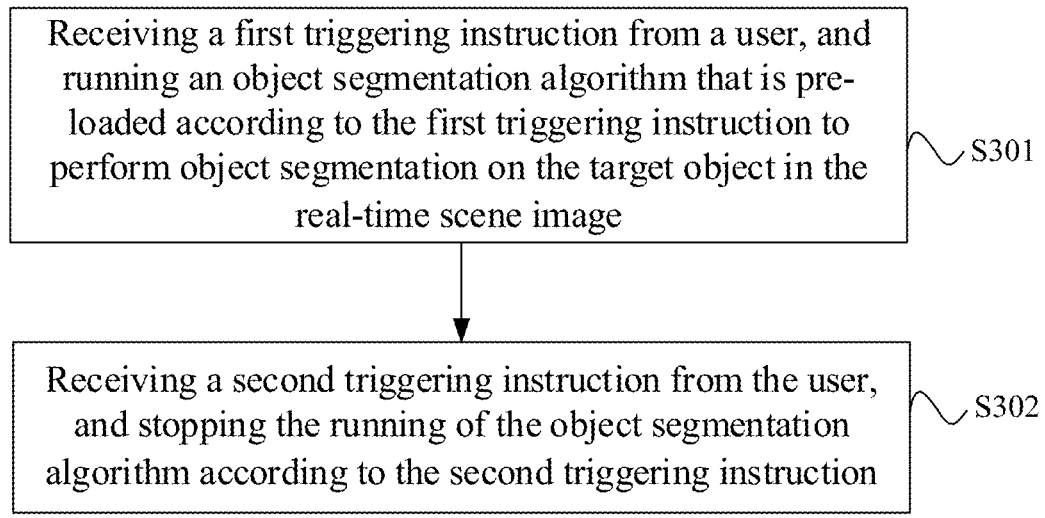
FIG. 7 is a schematic flowchart of an augmented reality-based display method according to an embodiment of the present disclosure.

On the basis of any embodiment described above, a pre-placement stage is further included after generating the virtual image corresponding to the target object based on the target object image and before performing the augmented display of the virtual image of the target object at the target position in the real-time scene image. That is to say, the virtual image corresponding to the target object may be suspended at a predetermined position in front of the image acquisition unit, and the virtual image may be then displayed at the target position after the target position in the real-time scene image is confirmed. On the basis of any embodiment described above, as shown in FIG. 7, the method further includes:

S301, receiving a first triggering instruction from a user, and running an object segmentation algorithm that is preloaded according to the first triggering instruction to perform object segmentation on the target object in the real-time scene image; and S302, receiving a second triggering instruction from the user, and stopping the running of the object segmentation algorithm according to the second triggering instruction.

In the embodiment, when obtaining the target object image in the real-time scene image captured by the image acquisition unit, for the object segmentation algorithm, in order to prevent the object segmentation algorithm from running for a long time and occupying the computing resource of the electronic device, the object segmentation algorithm may be controlled to run in time and stop running. When the object segmentation algorithm needs to be run, the user can give the first triggering instruction. The first triggering instruction may be a triggering instruction of turning on the image acquisition unit, or a triggering instruction issued by the user when the user triggers a start button in the interface in the process when the image acquisition unit captures the real-time scene image. The electronic device starts and runs the object segmentation algorithm in response to the triggering instruction from the user, thereby beginning to segment the target object from the real-time scene image.

Further, when the electronic device has obtained the target object image in the real-time scene image, the running of the object segmentation algorithm can be stopped at this point. Alternatively, the electronic device stops the running of the object segmentation algorithm in response to the second triggering instruction from the user. For example, the user closes the image acquisition unit or triggers a stop button in the interface. Alternatively, in response to the first instruction from the user for selecting the segmented target object image, the electronic device stops the running of the object segmentation algorithm according to the first instruction, the present disclosure may not be limited here.

For example, the electronic device runs the object segmentation algorithm in an algorithm module. When a first triggering instruction (corresponding to an instruction to trigger the algorithm to run) is received, the running of the object segmentation algorithm is started. When a second triggering instruction (corresponding to an instruction to trigger the algorithm to stop running) is received, the running of the object segmentation algorithm is stopped.

In one embodiment, after the user gives the first instruction for selecting the segmented target object image, the electronic device has obtained the target object image in the real-time scene image according to the first instruction, and the running of the object segmentation algorithm can be stopped at this point.

In one embodiment, the user can also control the start of the object segmentation algorithm through a long press operation. The object segmentation algorithm may keep running in the process of the long press operation. When the long press operation stops, the running of the object segmentation algorithm may be terminated.

The object segmentation algorithm is controlled to run in time and stop running by adopting the method as described above, and therefore, it can be avoided that the object segmentation algorithm runs for a long time in the electronic device and the computing resource of the electronic device can be saved.

Figure 8:
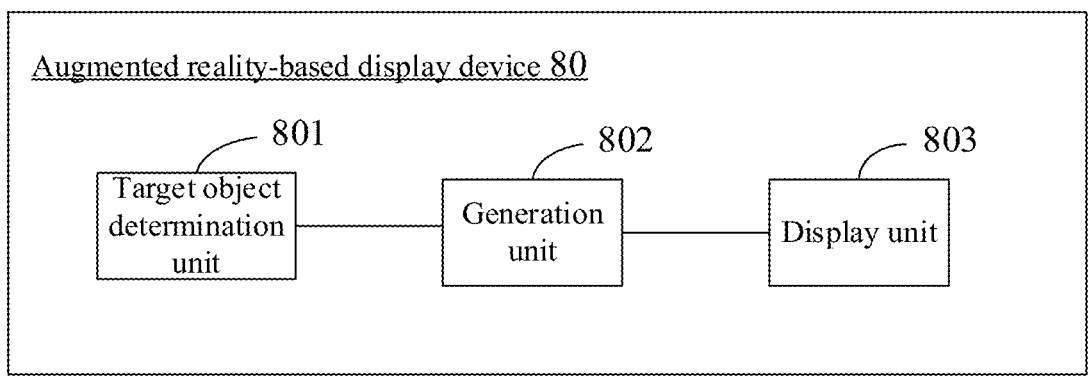
FIG. 8 is a structural block diagram of an augmented reality-based display device according to an embodiment of the present disclosure.

Corresponding to the augmented reality-based display method in the above embodiments, FIG. 8 is a structural block diagram of an augmented reality-based display device according to an embodiment of the present disclosure. For ease of description, only the parts related to the embodiments of the present disclosure are illustrated. With reference to FIG. 8, the augmented reality-based display device 80 includes a target object determination unit 801, a generation unit 802, and a display unit 803.

The target object determination unit 801 is configured to perform object segmentation on a target object in a real-time scene image captured by an image acquisition unit to obtain a target object image.

The generation unit 802 is configured to generate a virtual image corresponding to the target object based on the target object image.

The display unit 803 is configured to display the virtual image in the real-time scene image based on an augmented reality display technology.

According to one or more embodiments of the present disclosure, the generation unit 802, when generating a virtual image corresponding to the target object based on the target object image, is configured to: synthesize the target object image with an animation material to generate the virtual image corresponding to the target object.

The preset animation material includes a limb-body animation material and/or an expression animation material of the virtual image.

According to one or more embodiments of the present disclosure, the generation unit 802, when synthesizing the target object image with the animation material, is configured to: obtain the limb-body animation material and/or the expression animation material; determine a plurality of connection points on the target object image based on the target object image; and synthesize the limb-body animation material and/or the expression animation material with the target object image by means of the plurality of connection points to generate the virtual image corresponding to the target object.

According to one or more embodiments of the present disclosure, the target object determination unit 801, when performing object segmentation on the target object in the real-time scene image captured by the image acquisition unit to obtain the target object image, is configured to: run an object segmentation algorithm to perform object segmentation on the target object in the real-time scene image, thereby obtaining a mask and a bounding box of the target object image and obtaining a texture of an internal region of the mask.

According to one or more embodiments of the present disclosure, the generation unit 802, when synthesizing the limb-body animation material and/or the expression animation material with the target object image by means of the plurality of connection points to generate the virtual image corresponding to the target object, is configured to: synthesize the limb-body animation material and/or the expression animation material with the texture of the internal region of the mask by means of the plurality of connection points to generate the virtual image corresponding to the target object.

According to one or more embodiments of the present disclosure, the generation unit 802 is further configured to: adjust a size of the animation material based on a size of the bounding box; and adjust positions of the plurality of connection points on the target object image based on an axis of symmetry and a length-width ratio of the bounding box.

According to one or more embodiments of the present disclosure, the display unit 803 is further configured to: play the animation material to perform movement and/or expression control on the virtual image.

According to one or more embodiments of the present disclosure, the display unit 803, when playing the animation material to perform movement and/or expression control on the virtual image, is configured to: play the animation material according to preset animation frames of the animation material to perform movement and/or expression control on the virtual image; and/or generate and play animation frames of the animation material based on limb-body movements and/or expressions of a user, to perform movement and/or expression control on the virtual image.

According to one or more embodiments of the present disclosure, the display unit 803, when displaying the virtual image in the real-time scene image based on an augmented reality display technology, is configured to: create a virtual plane in the real-time scene image; generate a 3D space at the virtual plane; and display the virtual image of the target object in the generated 3D space based on the augmented reality display technology.

According to one or more embodiments of the present disclosure, the display unit 803, when creating a virtual plane based on a target plane region in the real-time scene image, is configured to: create the virtual plane based on the target plane region in a case of detecting that the target plane region exists in the real-time scene image, where the target plane region is a plane region having a distance to the image acquisition unit within a first preset distance range and/or a plane region located in a central region of the real-time scene image; or create the virtual plane at a particular position in the real-time scene image.

According to one or more embodiments of the present disclosure, the display unit 803, when displaying the virtual image of the target object in the generated 3D space based on the augmented reality display technology, is configured to: determine a target position in the 3D space; and display the virtual image of the target object at the target position in the 3D space based on the augmented reality display technology.

According to one or more embodiments of the present disclosure, the display unit 803, when determining the target position in the 3D space, is configured to: receive a position specifying instruction from a user, establish a three-dimensional anchor point in the three-dimensional space based on a position point triggered by the position specifying instruction from the user, and use the three-dimensional anchor point as the target position.

According to one or more embodiments of the present disclosure, the target object determination unit 801 is further configured to: receive a first triggering instruction from a user, and run an object segmentation algorithm that is pre-loaded according to the first triggering instruction to perform object segmentation on the target object in the real-time scene image; and receive a second triggering instruction from the user, and stop the running of the object segmentation algorithm according to the second triggering instruction.

According to one or more embodiments of the present disclosure, the display unit, when displaying the virtual image in the real-time scene image, is configured to: dynamically display the virtual image in the real-time scene image.

The augmented reality-based display device provided in the embodiment may be used to perform the technical solutions of the augmented reality-based display method of the method embodiments described above, the implementation principle and the technical effect of the augmented reality-based display device are similar to those of the method embodiments, and details are not described herein again in the embodiment.

Figure 9:
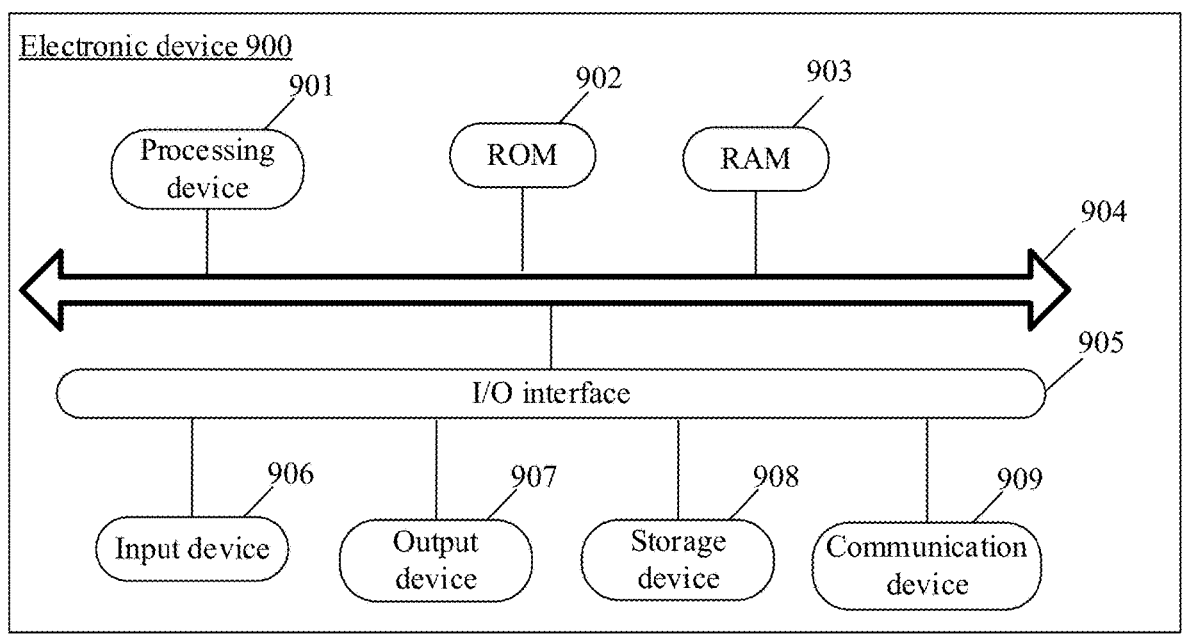
FIG. 9 is a schematic diagram illustrating a hardware structure of an electronic device according to an embodiment of the present disclosure.

Referring to FIG. 9 that is a schematic diagram illustrating a structure suitable for implementing an electronic device 900 according to an embodiment of the present disclosure. The electronic device 900 may be a terminal device or a server, and may be used to perform the augmented reality-based display method in the method embodiments described above. In particular, the terminal device may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and the like, and fixed terminals such as a digital TV, a desktop computer, and the like. The electronic device shown in FIG. 9 is merely an example, and should not impose any limitation on the functions and the range of use of the embodiments of the present disclosure.

As shown in FIG. 9, the electronic device 900 may include a processing device (e.g., a central processing unit, a graphics processing unit, etc.) 901, which can perform various suitable actions and processing according to a program stored in a read-only memory (ROM) 902 or a program loaded from a storage device 908 into a random access memory (RAM) 903. The RAM 903 further stores various programs and data required for operations of the electronic device 900. The processing device 901, the ROM 902, and the RAM 903 are connected to each other through a bus 904. An input/output (I/O) interface 905 is also connected to the bus 904.

Usually, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a loudspeaker, a vibrator, etc.; a storage device 908 including, for example, a magnetic tape, a hard disk, etc.; and a communication device 909. The communication unit 909 may allow the electronic device 900 to communicate wirelessly or by wire with other devices to exchange data. Although FIG. 9 illustrates the electronic device 900 having various devices, it is to be understood that all the illustrated devices are not necessarily implemented or included. More or less devices may be implemented or included alternatively.

Particularly, according to the embodiments of the present disclosure, the process described above with reference to the flowchart may be implemented as a computer software program. For example, an embodiment of the present disclosure includes a computer program product, which includes a computer program carried on a computer readable medium. The computer program includes program codes for executing the method shown in the flowchart, and may be used to execute the augmented reality-based display method in the method embodiments described above. In such an embodiment, the computer program may be downloaded online through the communication device 909 and installed, or installed from the storage device 908, or installed from the ROM 902. When the computer program is executed by the processing device 901, the above-mentioned functions defined in the method provided in the embodiments of the present disclosure are executed.

It needs to be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

The above-mentioned computer readable medium may be included in the electronic device described above, or may exist alone without being assembled into the electronic device.

The above-mentioned computer readable medium may carry one or more programs, when the one or more programs are executed by the electronic device, the electronic device is caused to perform the method illustrated in the above embodiments.

Computer program codes for performing the operations in the present disclosure may be written in one or more programming languages or a combination thereof. The programming languages include object oriented programming languages, such as Java, Smalltalk, and C++, and also include conventional procedural programming languages, such as "C" language or similar programming languages. The program code can be executed fully on a user's computer, executed partially on a user's computer, executed as an independent software package, executed partially on a user's computer and partially on a remote computer, or executed fully on a remote computer or a server. In the scenario involving a remote computer, the remote computer may be connected to the user's computer through any type of networks including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

Related units described in the embodiments of the present disclosure may be implemented by software, or may be implemented by hardware. The name of a unit does not constitute a limitation on the unit itself. For example, a first acquisition unit may also be described as "a unit for obtaining at least two Internet protocol addresses".

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semiconductor system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

In a first aspect, according to one or more embodiments of the present disclosure, an augmented reality-based display method is provided and includes: performing object segmentation on a target object in a real-time scene image captured by an image acquisition unit to obtain a target object image; generating a virtual image corresponding to the target object based on the target object image; and displaying the virtual image in the real-time scene image based on an augmented reality display technology.

According to one or more embodiments of the present disclosure, the generating a virtual image corresponding to the target object based on the target object image comprises: synthesizing the target object image with an animation material to generate the virtual image corresponding to the target object. The preset animation material comprises a limb-body animation material and/or an expression animation material of the virtual image.

According to one or more embodiments of the present disclosure, the synthesizing the target object image with an animation material comprises: obtaining the limb-body animation material and/or the expression animation material; determining a plurality of connection points on the target object image based on the target object image; and synthesizing the limb-body animation material and/or the expression animation material with the target object image by means of the plurality of connection points to generate the virtual image corresponding to the target object.

According to one or more embodiments of the present disclosure, the performing object segmentation on a target object in a real-time scene image captured by an image acquisition unit to obtain a target object image comprises: running an object segmentation algorithm to perform object segmentation on the target object in the real-time scene image, thereby obtaining a mask and a bounding box of the target object image and obtaining a texture of an internal region of the mask.

According to one or more embodiments of the present disclosure, the synthesizing the limb-body animation material and/or the expression animation material with the target object image by means of the plurality of connection points to generate the virtual image corresponding to the target object comprises: synthesizing the limb-body animation material and/or the expression animation material with the texture of the internal region of the mask by means of the plurality of connection points to generate the virtual image corresponding to the target object.

According to one or more embodiments of the present disclosure, the method further comprises: adjusting a size of the animation material based on a size of the bounding box; and adjusting positions of the plurality of connection points on the target object image based on an axis of symmetry and a length-width ratio of the bounding box.

According to one or more embodiments of the present disclosure, the method further comprises: playing the animation material to perform movement and/or expression control on the virtual image.

According to one or more embodiments of the present disclosure, the playing the animation material to perform movement and/or expression control on the virtual image comprises: playing the animation material according to preset animation frames of the animation material to perform movement and/or expression control on the virtual image; and/or generating and playing animation frames of the animation material based on limb-body movements and/or expressions of a user, to perform movement and/or expression control on the virtual image.

According to one or more embodiments of the present disclosure, the displaying the virtual image in the real-time scene image based on an augmented reality display technology comprises: creating a virtual plane in the real-time scene image; generating a three-dimensional space at the virtual plane; and displaying the virtual image of the target object in the three-dimensional space that is generated based on the augmented reality display technology.

According to one or more embodiments of the present disclosure, the creating a virtual plane based on a target plane region in the real-time scene image comprises: creating the virtual plane based on the target plane region in a case of detecting that the target plane region exists in the real-time scene image, where the target plane region is a plane region having a distance to the image acquisition unit within a first preset distance range and/or a plane region located in a central region of the real-time scene image; or creating the virtual plane at a particular position in the real-time scene image.

According to one or more embodiments of the present disclosure, the displaying the virtual image of the target object in the three-dimensional space that is generated based on the augmented reality display technology comprises: determining a target position in the three-dimensional space; and displaying the virtual image of the target object at the target position in the three-dimensional space based on the augmented reality display technology.

According to one or more embodiments of the present disclosure, the determining a target position in the three-dimensional space comprises: receiving a position specifying instruction from a user, establishing a three-dimensional anchor point in the three-dimensional space based on a position point triggered by the position specifying instruction from the user, and using the three-dimensional anchor point as the target position.

According to one or more embodiments of the present disclosure, the method further comprises: receiving a first triggering instruction from a user, and running an object segmentation algorithm that is pre-loaded according to the first triggering instruction to perform object segmentation on the target object in the real-time scene image; and receiving a second triggering instruction from the user, and stopping the running of the object segmentation algorithm according to the second triggering instruction.

According to one or more embodiments of the present disclosure, the displaying the virtual image in the real-time scene image comprises: dynamically displaying the virtual image in the real-time scene image.

In a second aspect, according to one or more embodiments of the present disclosure, an augmented reality-based display device is provided and includes: a target object determination unit, configured to perform object segmentation on a target object in a real-time scene image captured by an image acquisition unit to obtain a target object image; a generation unit, configured to generate a virtual image corresponding to the target object based on the target object image; and a display unit, configured to display the virtual image in the real-time scene image based on an augmented reality display technology.

According to one or more embodiments of the present disclosure, the generation unit, when generating a virtual image corresponding to the target object based on the target object image, is configured to: synthesize the target object image with an animation material to generate the virtual image corresponding to the target object.

The preset animation material includes a limb-body animation material and/or an expression animation material of the virtual image.

According to one or more embodiments of the present disclosure, the generation unit, when synthesizing the target object image with the animation material, is configured to: obtain the limb-body animation material and/or the expression animation material; determine a plurality of connection points on the target object image based on the target object image; and synthesize the limb-body animation material and/or the expression animation material with the target object image by means of the plurality of connection points to generate the virtual image corresponding to the target object.

According to one or more embodiments of the present disclosure, the target object determination unit, when performing object segmentation on the target object in the real-time scene image captured by the image acquisition unit to obtain the target object image, is configured to: run an object segmentation algorithm to perform object segmentation on the target object in the real-time scene image, thereby obtaining a mask and a bounding box of the target object image and obtaining a texture of an internal region of the mask.

According to one or more embodiments of the present disclosure, the generation unit, when synthesizing the limb-body animation material and/or the expression animation material with the target object image by means of the plurality of connection points to generate the virtual image corresponding to the target object, is configured to: synthesize the limb-body animation material and/or the expression animation material with the texture of the internal region of the mask by means of the plurality of connection points to generate the virtual image corresponding to the target object.

According to one or more embodiments of the present disclosure, the generation unit is further configured to: adjust a size of the animation material based on a size of the bounding box; and adjust positions of the plurality of connection points on the target object image based on an axis of symmetry and a length-width ratio of the bounding box.

According to one or more embodiments of the present disclosure, the display unit is further configured to: play the animation material to perform movement and/or expression control on the virtual image.

According to one or more embodiments of the present disclosure, the display unit, when playing the animation material to perform movement and/or expression control on the virtual image, is configured to: play the animation material according to preset animation frames of the animation material to perform movement and/or expression control on the virtual image; and/or generate and play animation frames of the animation material based on limb-body movements and/or expressions of a user, to perform movement and/or expression control on the virtual image.

According to one or more embodiments of the present disclosure, the display unit, when displaying the virtual image in the real-time scene image based on an augmented reality display technology, is configured to: create a virtual plane in the real-time scene image; generate a 3D space at the virtual plane; and display the virtual image of the target object in the generated 3D space based on the augmented reality display technology.

According to one or more embodiments of the present disclosure, the display unit, when creating a virtual plane based on a target plane region in the real-time scene image, is configured to: create the virtual plane based on the target plane region in a case of detecting that the target plane region exists in the real-time scene image, where the target plane region is a plane region having a distance to the image acquisition unit within a first preset distance range and/or a plane region located in a central region of the real-time scene image; or create the virtual plane at a particular position in the real-time scene image.

According to one or more embodiments of the present disclosure, the display unit, when displaying the virtual image of the target object in the generated 3D space based on the augmented reality display technology, is configured to: determine a target position in the 3D space; and display the virtual image of the target object at the target position in the 3D space based on the augmented reality display technology.

According to one or more embodiments of the present disclosure, the display unit, when determining the target position in the 3D space, is configured to: receive a position specifying instruction from a user, establish a three-dimensional anchor point in the three-dimensional space based on a position point triggered by the position specifying instruction from the user, and use the three-dimensional anchor point as the target position.

According to one or more embodiments of the present disclosure, the target object determination unit is further configured to: receive a first triggering instruction from a user, and run an object segmentation algorithm that is pre-loaded according to the first triggering instruction to perform object segmentation on the target object in the real-time scene image; and receive a second triggering instruction from the user, and stop the running of the object segmentation algorithm according to the second triggering instruction.

According to one or more embodiments of the present disclosure, the display unit, when displaying the virtual image in the real-time scene image, is configured to: dynamically display the virtual image in the real-time scene image.

In a third aspect, according to one or more embodiments of the present disclosure, an electronic device is provided and includes: at least one processor and a memory; the memory stores computer executable instructions; the at least one processor executes the computer executable instructions stored in the memory to cause the at least one processor to perform the method described in the first aspect and various possible designs of the first aspect above.

In a fourth aspect, according to one or more embodiments of the present disclosure, a computer readable storage medium is provided, the computer readable storage medium stores computer executable instructions, when the computer executable instructions are executed by a processor, the method described in the first aspect and various possible designs of the first aspect above is implemented.

The foregoing descriptions are merely the illustrations of the alternative embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated particular order or in a sequential order. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Conversely, various features described in the context of a single embodiment may also be implemented in various embodiments individually or in a plurality of embodiments in any appropriate sub-combination.

Although the present subject matter has been described in a language specific to structural features and/or logical method acts, it will be appreciated that the subject matter defined in the appended claims is not necessarily limited to the particular features or acts described above. Rather, the particular features and acts described above are merely exemplary forms for implementing the claims.

What is claimed is:
1. An augmented reality-based display method, comprising:
performing object segmentation on a target object in a real-time scene image captured by an image acquisition unit to obtain a target object image;
generating a virtual image corresponding to the target object based on the target object image; and
displaying the virtual image in the real-time scene image based on an augmented reality display technology, wherein the displaying the virtual image in the real-time scene image based on an augmented reality display further comprises:
creating a virtual plane in the real-time scene image,
generating a three-dimensional space at the virtual plane,
determining a target position in the three-dimensional space, wherein the determining a target position in the three-dimensional space further comprises receiving a position specifying instruction from a user, establishing a three-dimensional anchor point in the three-dimensional space based on a position point triggered by the position specifying instruction from the user, and identifying the three-dimensional anchor point as the target position, and
displaying the virtual image at the target position in the three-dimensional space.

2. The augmented reality-based display method according to claim 1, wherein the generating a virtual image corresponding to the target object based on the target object image comprises:
synthesizing the target object image with an animation material to generate the virtual image corresponding to the target object, wherein the animation material comprises at least one of a limb-body animation material or an expression animation material of the virtual image.

3. The augmented reality-based display method according to claim 2, wherein the synthesizing the target object image with an animation material comprises:
obtaining the at least one of the limb-body animation material or the expression animation material;
determining a plurality of connection points on the target object image based on the target object image; and
synthesizing the at least one of the limb-body animation material or the expression animation material with the target object image by means of the plurality of connection points to generate the virtual image corresponding to the target object.

4. The augmented reality-based display method according to claim 3, wherein the performing object segmentation on a target object in a real-time scene image captured by an image acquisition unit to obtain a target object image comprises:
running an object segmentation algorithm to perform object segmentation on the target object in the real-time scene image, thereby obtaining a mask and a bounding box of the target object image and obtaining a texture of an internal region of the mask.

5. The augmented reality-based display method according to claim 4, wherein the synthesizing the at least one of the limb-body animation material or the expression animation material with the target object image by means of the plurality of connection points to generate the virtual image corresponding to the target object comprises:
synthesizing the at least one of the limb-body animation material or the expression animation material with the texture of the internal region of the mask by means of the plurality of connection points to generate the virtual image corresponding to the target object.

6. The augmented reality-based display method according to claim 5, further comprising:
adjusting a size of the animation material based on a size of the bounding box; and
adjusting positions of the plurality of connection points on the target object image based on an axis of symmetry and a length-width ratio of the bounding box.

7. The augmented reality-based display method according to claim 4, further comprising:
adjusting a size of the animation material based on a size of the bounding box; and
adjusting positions of the plurality of connection points on the target object image based on an axis of symmetry and a length-width ratio of the bounding box.

8. The augmented reality-based display method according to claim 3, further comprising:
playing the animation material to perform at least one of movement or expression control on the virtual image.

9. The augmented reality-based display method according to claim 2, further comprising:
playing the animation material to perform at least one of movement or expression control on the virtual image.

10. The augmented reality-based display method according to claim 9, wherein the playing the animation material to perform at least one of movement or expression control on the virtual image comprises:
playing the animation material according to preset animation frames of the animation material to perform the at least one of movement or expression control on the virtual image; and/or
generating and playing animation frames of the animation material based on at least one of limb-body movements or expressions of a user, to perform the at least one of movement or expression control on the virtual image.

11. The augmented reality-based display method according to claim 1, wherein the creating a virtual plane in the real-time scene image comprises:
in response to detecting that a target plane region exists in the real-time scene image, creating the virtual plane based on the target plane region, wherein the target plane region is a plane region having a distance to the image acquisition unit within a first preset distance range or a plane region located in a central region of the real-time scene image; or
creating the virtual plane at a particular position in the real-time scene image.

12. The augmented reality-based display method according to claim 1, further comprising:
receiving a first triggering instruction from a user, and running an object segmentation algorithm that is preloaded according to the first triggering instruction to perform object segmentation on the target object in the real-time scene image; and
receiving a second triggering instruction from the user, and stopping the running of the object segmentation algorithm according to the second triggering instruction.

13. The augmented reality-based display method according to claim 1, wherein the displaying the virtual image in the real-time scene image comprises:
dynamically displaying the virtual image in the real-time scene image.

14. An electronic device, comprising:
at least one processor; and
at least one memory, wherein the at least one memory stores computer executable instructions; and the at least one processor executes the computer executable instructions stored in the at least one memory to cause the at least one processor to perform operations comprising:
performing object segmentation on a target object in a real-time scene image captured by an image acquisition unit to obtain a target object image;
generating a virtual image corresponding to the target object based on the target object image; and displaying the virtual image in the real-time scene image based on an augmented reality display technology, wherein the displaying the virtual image in the real-time scene image based on an augmented reality display further comprises:
creating a virtual plane in the real-time scene image,
generating a three-dimensional space at the virtual plane,
determining a target position in the three-dimensional space, wherein the determining a target position in the three-dimensional space further comprises receiving a position specifying instruction from a user, establishing a three-dimensional anchor point in the three-dimensional space based on a position point triggered by the position specifying instruction from the user, and identifying the three-dimensional anchor point as the target position, and
displaying the virtual image at the target position in the three-dimensional space.

15. The electronic device of claim 14, the operations further comprising:
synthesizing the target object image with an animation material to generate the virtual image corresponding to the target object, wherein the animation material comprises at least one of a limb-body animation material or an expression animation material of the virtual image.

16. The electronic device of claim 15, wherein the synthesizing the target object image with an animation material further comprises:
obtaining the at least one of the limb-body animation material or the expression animation material;
determining a plurality of connection points on the target object image based on the target object image; and
synthesizing the at least one of the limb-body animation material or the expression animation material with the target object image by means of the plurality of connection points to generate the virtual image corresponding to the target object.

17. The electronic device of claim 16, the operations further comprising:
running an object segmentation algorithm to perform object segmentation on the target object in the real-time scene image, thereby obtaining a mask and a bounding box of the target object image and obtaining a texture of an internal region of the mask.

18. The electronic device of claim 17, the operations further comprising:
synthesizing the at least one of the limb-body animation material or the expression animation material with the texture of the internal region of the mask by means of the plurality of connection points to generate the virtual image corresponding to the target object.

19. The electronic device of claim 17, the operations further comprising:
adjusting a size of the animation material based on a size of the bounding box; and
adjusting positions of the plurality of connection points on the target object image based on an axis of symmetry and a length-width ratio of the bounding box.

20. A non-transitory computer readable storage medium, wherein the non-transitory computer readable storage medium stores computer executable instructions that upon execution by a processor cause the processor to perform operations comprising:
performing object segmentation on a target object in a real-time scene image captured by an image acquisition unit to obtain a target object image;
generating a virtual image corresponding to the target object based on the target object image; and
displaying the virtual image in the real-time scene image based on an augmented reality display technology, wherein the displaying the virtual image in the real-time scene image based on an augmented reality display further comprises:
creating a virtual plane in the real-time scene image,
generating a three-dimensional space at the virtual plane,
determining a target position in the three-dimensional space, wherein the determining a target position in the three-dimensional space further comprises receiving a position specifying instruction from a user, establishing a three-dimensional anchor point in the three-dimensional space based on a position point triggered by the position specifying instruction from the user, and identifying the three-dimensional anchor point as the target position, and
displaying the virtual image at the target position in the three-dimensional space.

* * * * *